(12) United States Patent
Betz et al.

(10) Patent No.: US 7,840,542 B2
(45) Date of Patent: Nov. 23, 2010

(54) METHOD AND SYSTEM FOR CONTROLLING ACCESS TO SEMANTIC WEB STATEMENTS

(75) Inventors: Joseph P. Betz, Arlington, MA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/348,195

(22) Filed: Feb. 6, 2006

(65) Prior Publication Data

US 2007/0198456 A1 Aug. 23, 2007

(51) Int. Cl.
G06F 7/00 (2006.01)
G06F 17/00 (2006.01)

(52) U.S. Cl. ..................................... 707/694

(58) Field of Classification Search ............... 707/100, 707/4, 999.1, 999.004, 694; 726/6
See application file for complete search history.

(56) References Cited

U.S. PATENT DOCUMENTS

| | | | |
|---|---|---|---|
| 6,418,448 B1 | 7/2002 | Sarkar | |
| 6,856,992 B2 | 2/2005 | Britton et al. | |
| 7,251,648 B2* | 7/2007 | Chaudhuri et al. | 707/3 |
| 7,373,341 B2* | 5/2008 | Polo-Malouvier | 707/3 |
| 2003/0074352 A1 | 4/2003 | Raboczi et al. | |
| 2003/0145022 A1 | 7/2003 | Dingley | |
| 2003/0158851 A1 | 8/2003 | Britton et al. | |
| 2003/0208499 A1 | 11/2003 | Bigwood et al. | |
| 2004/0073545 A1 | 4/2004 | Greenblatt et al. | |
| 2004/0153467 A1 | 8/2004 | Conover et al. | |
| 2004/0158455 A1 | 8/2004 | Spivack et al. | |
| 2004/0210552 A1 | 10/2004 | Friedman et al. | |
| 2004/0210914 A1 | 10/2004 | Kinner et al. | |
| 2004/0225629 A1 | 11/2004 | Eder | |
| 2005/0033768 A1 | 2/2005 | Sayers et al. | |
| 2005/0192941 A1* | 9/2005 | Biedenstein et al. | 707/3 |
| 2005/0262551 A1* | 11/2005 | Chen et al. | 726/6 |

(Continued)

OTHER PUBLICATIONS

Sergey Melnik, Storing RDF in a relational database, http://infolab.stanford.edu/~melnik/rdf/db.html, May 11, 2000, Last modified: Dec. 3, 2001.*

(Continued)

*Primary Examiner*—Mohammad Ali
*Assistant Examiner*—Alexey Shmatov
(74) *Attorney, Agent, or Firm*—Scully, Scott, Murphy & Presser, P.C.; John E. Campbell

(57) ABSTRACT

The invention provides a method and system for controlling access to semantic web statements. The method comprises the steps of providing a set of semantic web statements in a defined format, and storing the statements in one or more first tables; and constructing a set of access control lists in the defined format, and storing the lists in one or more second tables. Each of the access control lists of the second tables is connected to one or more of the statements of the first tables, and the access control lists are used to enforce access rules to the semantic statements. Preferably, this access is enforced by filtering out web statements that users do not have permission to read, and by returning errors when users attempt to make changes to the semantic statements that the users do not have permission to change.

6 Claims, 2 Drawing Sheets

U.S. PATENT DOCUMENTS

2006/0248093 A1* 11/2006 Lassila et al. .............. 707/100
2006/0271563 A1* 11/2006 Angelo et al. .............. 707/100

OTHER PUBLICATIONS

Kiryakov, et al., "Knowledge Control System—The Backbone of Ontology Middleware", *Ontology Middleware: Analysis and Design*, Mar. 2002, p. 1.

Dimitrakos, et al., "Towards Security and Trust Management Policies on the Web", *CLRC Rutherford Appleton Laboratory*, pp. 1-5.

Gowadia, et al., "RDF Metadata for XML Access Control", *ACM Workshop on XML Security*, Oct. 31, 2003, pp. 39-48.

Kodali, et al., "An Authorization Model for Multimedia Digital Libraries", pp. 1-17.

Clark, "How the Semantic Web Will *Really Happen*", *XML*.com, 1998-2004.

* cited by examiner

METHOD AND SYSTEM FOR CONTROLLING ACCESS TO SEMANTIC WEB STATEMENTS

BACKGROUND OF THE INVENTION

1. Field of the Invention

This invention generally relates to semantic web technology, and more specifically, to methods and systems for controlling access to semantic web statements. Even more specifically, the invention relates to such methods and systems that are particularly well suited for use with the Resource Description Framework (RDF) language.

2. Background Art

RDF is a language used to represent information, particularly meta data, about resources available in the World Wide Web. For example, RDF may be used to represent copyright or licensing information about a document on the Web, or the author and title of a particular Web page. RDF can also be employed for representing data or meta data about items or matters that can be identified on the World Wide Web even though these items cannot be directly retrieved from the Web. Examples of these latter items may include data about a user's Web preferences, and information, such as the price and availability, of items for sale at on-line shopping facilities. Specifications for RDF are established by the World Wide Web Consortium.

RDF uses identifiers, referred to as Uniform Resource Identifiers, or URIs, and is based on a specific terminology. An RDF statement includes a subject, a predicate and an object. The subject identifies the thing, such as person or Web page, that the statement is about. The predicate identifies the property or characteristic, such as title or owner, of the subject of the RDF statement, and the object identifies a value of that property or characteristic. For example, if the RDF statement is about pet owners, the subject might be "owner," the predicate could be "name," and the object could be "Joe." This format, among other advantages, allows RDF to represent statements as a graph of nodes and arcs. In the graph, the subjects and objects may be represented by, for example, ovals, circles or squares, or some combination thereof, while the predicates of the RDF statements may be represented by arcs or arrows connecting the subject of each statement with the object of the statement.

An important feature of RDF is that it provides a common framework for expressing information. This allows this information to be exchanged among applications without losing any meaning of the information. Because of this common framework, application developers can utilize the availability of common tools and parsers to process RDF information.

RDF data access requests in conventional systems are defined by "Triple Patterns," which limit the RDF statement(s) they are requesting by constraining any or all of the three parts of an RDF statement: the subject, predicate and object. For example, the triple pattern "(<Person001>, <name>, ?)" requests only RDF statements where the subject is "Person001," and the predicate is "name" (the "?" for the object is used as a wildcard and means the object can be anything).

A number of RDF storage systems are built on top of relational databases. In such systems, RDF statements are stored in relational database tables created specifically to hold RDF. Conventional RDF repositories include a data access subsystem to control user access to the RDF statements. While granular access control is found in many enterprise level systems, conventional RDF storage systems have not defined RDF statement level access control, nor have any systems defined access control semantically via RDF statements. As a result, no conventional RDF storage systems can provide different users with views of a RDF graph depending on their read access rights.

SUMMARY OF THE INVENTION

An object of this invention is to provide granular access control to semantic web statements.

Another object of the present invention is to provide a storage system for semantic web statements that can provide different users with views of a semantic web statement graph depending on the users' read access rights.

A further object of the invention is to enforce access control rules for accessing semantic web statements, by storing access control data in relational tables designed for that access control data.

Another object of the present invention is to extend a conventional repository for semantic web statements with additional tables to store access control list information.

These and other objectives are attained with a method and system for controlling access to semantic web statements. The method comprises the steps of providing a set of semantic web statements in a defined format, and storing said set of statements in one or more first tables, constructing a set of access control lists in said defined format, and storing said set of lists in one or more second tables. Each of the lists of the second tables is connected to one or more of the statements of the first tables, and said access control lists in said second tables are used to enforce access rules to said semantic web statements in said one or more first tables. Preferably, this access is enforced by filtering out web statements that users do not have permission to read according to said access control lists; and by returning errors when users attempt to make changes to the semantic web statements that said users do not have permission to read according to said access control lists. In addition, reification may be used to connect the lists of the second tables to the statements of the first tables, although other suitable procedures may also be used to make these connections.

In a preferred embodiment, this granular access control is obtained by constructing access control lists (ACLs) in Resource Description Framework (RDF) and by connecting the ACLs to statements via reification. Reification is a method of uniquely identifying an RDF statement and enables information about an RDF statement to be connected to that statement. This system not only allows a system to express access control rules but also enforces them by storing access control data in specific tables, for example as described in copending application Ser. No. 11/348,196 filed Feb. 6, 2006 for "Method and System For Efficiently Storing Semantic Web Statements In A Relational Database," the disclosure of which is hereby incorporated herein by reference. By storing access control in tables this way, the access control data can enforce the access control rules both by filtering out RDF statements users do not have permission to read and to applying write permissions by returning errors when users attempt to make changes they do not have permission to make.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
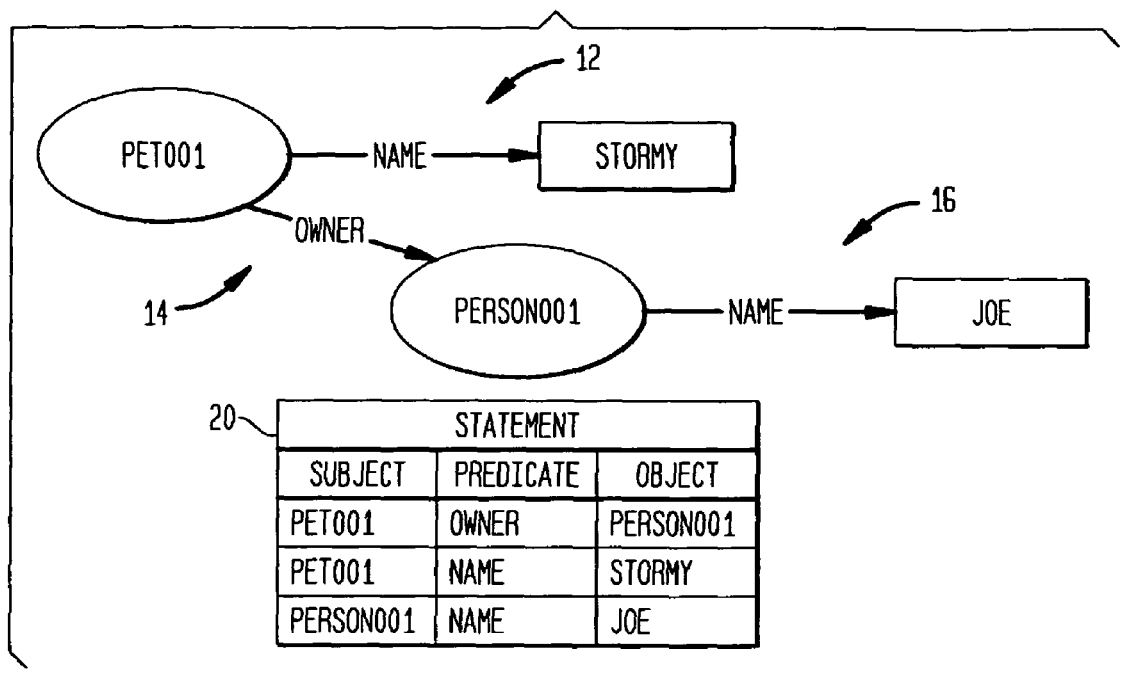
FIG. 1 depicts how many conventional RDF storage systems store the subject, predicate and object components of each RDF statement into a single Statement table.

FIG. 1 depicts how RDF statements may be stored in a conventional RDF repository. Three RDF statements, referenced at 12, 14 and 16, are shown in FIG. 1, and these statements are stored in a Statement Table 20 in a relational database with columns for the "subject," "predicate" and "object" of the RDF statements. In one statement 12, the subject is Pet001, the predicate is owner, and the object is Person001. In a second statement 14, the subject is, again, Pet001, the predicate is name, and the object is Stormy. In the third shown statement 16, the subject, predicate, and object are, respectively, Person001, name and Joe.

Figure 2:
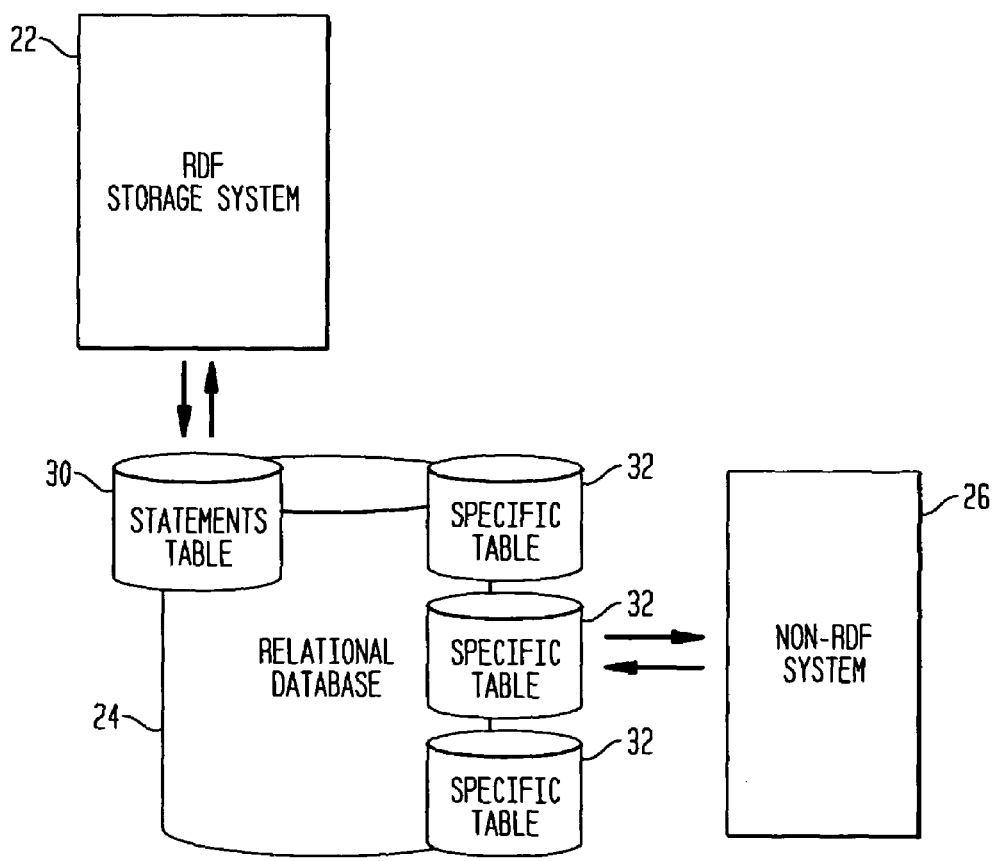
FIG. 2 illustrates a storage system that may be used to practice the present invention.

FIG. 2 illustrates a conventional RDF storage system modified in order to implement the present invention. In particular, FIG. 2 shows a conventional RDF storage system 22, a relational database 24, and non-RDF system components 26. FIG. 2 also shows a conventional Statements Table 30, and a set of Specific Tables 32.

Figure 3:
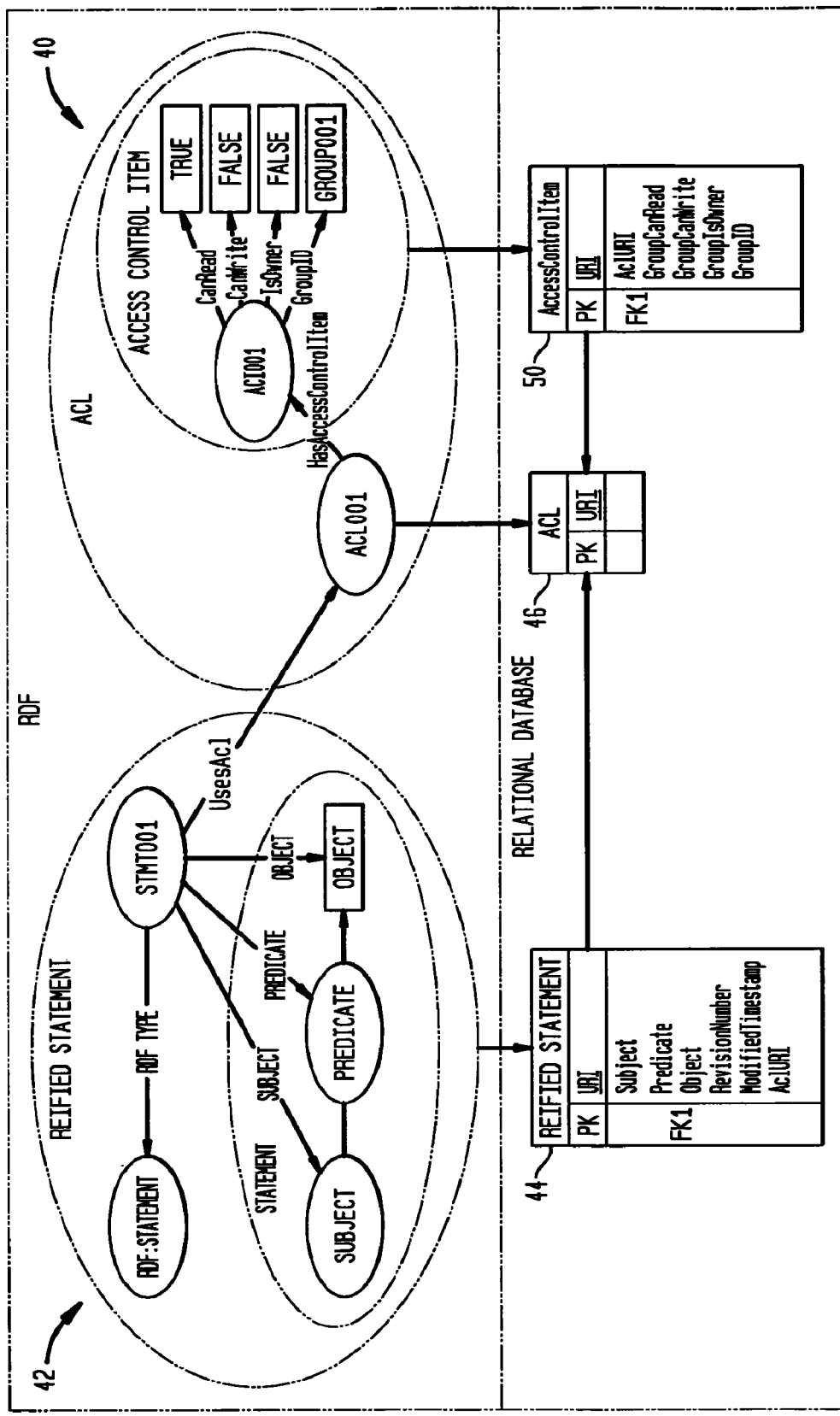
FIG. 3 shows the structure of an ACL linked to the structure of a reified RDF statement. This structure is shown both as a graph and as a relational database schema.

Most conventional RDF repositories store RDF in a relational database 24, which, for the present invention, is extended with additional tables to store access control list (ACL) information. FIG. 3 (RDF and relational database structure) depicts the structure of an ACL 40 linked to the structure of a reified RDF statement 42. This structure is shown both as a graph (where boxes and circles are nodes and arrows are edges), which is how RDF is usually represented, and as a relational database schema 44, which is how RDF is stored in this system. Black arrows point down from the RDF structure in the graph diagram to the relational database structures to show the mapping from RDF to relational database schema.

An example embodiment of this invention involves adding two tables 46 and 50 to the relational database, one called "ACL" and another called "AccessControlItem" to store the required ACL information. A table where RDF statements are stored typically is already defined as part of the existing RDF repository. Since the preferred access control method of this invention requires reification, in this example embodiment, the RDF statement table 44 is modified to include a "URI" column to enable mandatory reification and a "usesAcl" column to enable access control.

After these additions, this example embodiment's relational database is the same as that found in FIG. 3. In the preferred embodiment of this invention, it is important that the RDF repository has user authentication. If the conventional repository does not have user authentication, it preferably is added. Also, in the preferred embodiment, the tables for users and groups already are added to the repository and all connections made to the repository require authentication.

Once the required database tables for ACL information and user information are present, the components of the RDF repository that enable querying, inserting, updating and deleting of RDF are preferably extended to use this ACL information. RDF repositories provide data access to RDF statements through a query mechanism which, in this example embodiment, is extended to filter out statements from queries that the current user has no privileges to read. This filtering is performed by adding a condition to each relational query sent to the relational database that specifies only to include statements in the query results if the current user has read access in the associated ACL.

For this example embodiment, the condition clause is specified in the WHERE clause of an SQL statement: "Where ReifiedStatement.usesAcl=AccessControlItem.AclURI AND AccessControlItem.GroupCanRead=true AND GroupID=UsersGroups.ID AND Users.ID=<currentUserID>". Additionally, the query mechanism is preferably extended to include the data in the "AccessControlItems" and "ACL" table and "usesAcl" and "URI" columns as RDF statements in the query results.

Next, the update and delete mechanisms of the RDF repository are preferably extended to return errors when users attempt to update or remove statements they do not have privileges to change. In this example embodiment, a check is performed before each update or remove request to verify the current user has change privileges and return an error if the user does not.

Also, the insert, update and delete mechanisms are preferably extended to detect requests involving the RDF statements used to construct ACL information. In the example embodiment, this is any statement with one of the following predicates (see FIG. 3) "usesAcl", "hasAccessControlItem", "CanRead", "CanWrite", "IsOwner" or "GroupID". For any inserts, updates or deletions, a check is first performed to verify the current user has ownership privileges for the ACL to be modified by the request, and then the insert, update or deletion is translated to the appropriate relational database insert, update or delete on "ReifiedStatement", "ACL" or "AccessControlItem" tables.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of controlling access to semantic web statements, comprising the steps of:

providing a set of semantic web statements in a defined format, and storing said set of statements in one or more first tables, the first tables including at least one subject, at least one object, at least one URI (Uniform Resource Identifier) within the first tables;

constructing a set of access control lists in said defined format, and storing said set of lists in one or more second tables wherein said access control lists are linked to reified web statements;

connecting the second tables to the first tables via a set of third tables storing the uniform resource identifier, wherein the first tables, the second tables and the third tables are connected through the URI, the URI for performing mandatory reification of said semantic web statements, said mandatory reification expressing in said third tables characteristic connections between the subject in the first tables and the object in the first tables, said characteristic connections represented by sentences;

using the second tables to enforce access rules to said semantic web statements;

filtering out semantic web statements that a user does not have permission to read according to said access control lists, wherein the filtering is performed by adding a condition to each relational query sent to a relational database; and returning errors when users attempt to make changes to said semantic web statements that said users do not have permission to change according to said access control lists, using a pre-existing storage subsystem implementing a query mechanism for any one of querying, inserting, updating or deletion of said semantic web statements, wherein the step of using said second tables includes a step of extending said query mechanism to use said access control lists to filter out statements from queries that a user has no privilege to read, wherein a program causes a computer system to perform said providing, said constructing, said connecting, said using the second tables, said filtering, said returning, and said using the pre-existing storage subsystem.

2. The method according to claim 1, wherein the extending step includes the step of adding a condition to each query from a current user to the database that specifies to include statements in query results only if said current user has a read access in an associated access control list.

3. A computer-implemented system for controlling access to semantic web statements, said system comprising:

a computer-implemented means for providing a set of semantic web statements in a defined format, and storing said set of statements in one or more first tables, the first tables including at least one subject, at least one object, at least one URI (Uniform Resource Identifier) within the first tables;

a computer-implemented means for constructing a set of access control lists in said defined format, and storing said set of lists in one or more second tables wherein said access control lists are linked to reified web statements;

a computer-implemented means for connecting the second tables to the first tables via a set of third tables storing the uniform resource identifier, wherein the first tables, the second tables and the third tables are connected through the URI, the URI for performing mandatory reification of said semantic web statements, said mandatory reification expressing in said third tables characteristic connections between the subject in the first tables and the object in the first tables, said characteristic connections represented by sentences;

a computer-implemented means for using the second tables to enforce access rules to said semantic web statements;

a computer-implemented means for filtering out semantic web statements that a user does not have permission to read according to said access control lists, wherein the filtering is performed by adding a condition to each relational query sent to a relational database;

a computer-implemented means for returning errors when users attempt to make changes to said semantic web statements that said users do not have permission to change according to said access control lists;

a pre-existing storage subsystem implementing a query mechanism for any one of querying, inserting, updating or deleting of said semantic web statements, wherein the computer-implemented means for using said second tables includes a computer-implemented means for extending said query mechanism to use said access control lists to filter out statements from queries that a user has no privilege to read.

4. The computer-implemented system according to claim 3, wherein the computer-implemented means for extending includes a computer-implemented means for adding a condition to each query from a current user to the database that specifies to include statements in query results only if said current user has a read access in an associated access control list.

5. A computer program product for controlling access to semantic web statements, the computer program product comprising a tangible storage medium readable by a processing circuit and storing instructions for execution by the processing circuit for performing a method comprising:

providing a set of semantic web statements in a defined format, and storing said set of statements in one or more first tables, the first tables including at least one subject, at least one object, at least one URI (Uniform Resource Identifier) within the first table;

constructing a set of access control lists in said defined format, and storing said set of lists in one or more second tables wherein said access control lists are linked to reified web statements;

connecting the second tables to the first tables via a set of third tables storing the uniform resource identifier, wherein the first tables, the second tables and the third tables are connected through the URI, the URI for performing mandatory reification of said semantic web statements, said mandatory reification expressing in said third tables characteristic connections between the subject in the first tables and the object in the first tables, said characteristic connections represented by sentences;

using the second tables to enforce access rules to said semantic web statements;

filtering out semantic web statements that a user does not have permission to read according to said access control lists, wherein the filtering is performed by adding a condition to each relational query sent to a relational database; and returning errors when users attempt to make changes to said semantic web statements that said users do not have permission to change according to said access control lists, using a pre-existing storage subsystem implementing a query mechanism for any one of querying, inserting, updating or deletion of said semantic web statements, wherein the step of using said second tables includes a step of extending said query mechanism to use said access control lists to filter out statements from queries that a user has no privilege to read, wherein a program causes a computer system to perform said providing, said constructing, said connecting, said using the second tables, said filtering, said returning, and said using the pre-existing storage subsystem.

6. The computer program product according to claim 5, wherein the extending step includes a step of adding a condition to each query from a current user to the database that specifies to include statements in query results only if said current user has a read access in an associated access control list.

* * * * *